March 10, 1953 — A. PITNER — 2,631,070
SPINDLE BEARING
Filed July 12, 1946
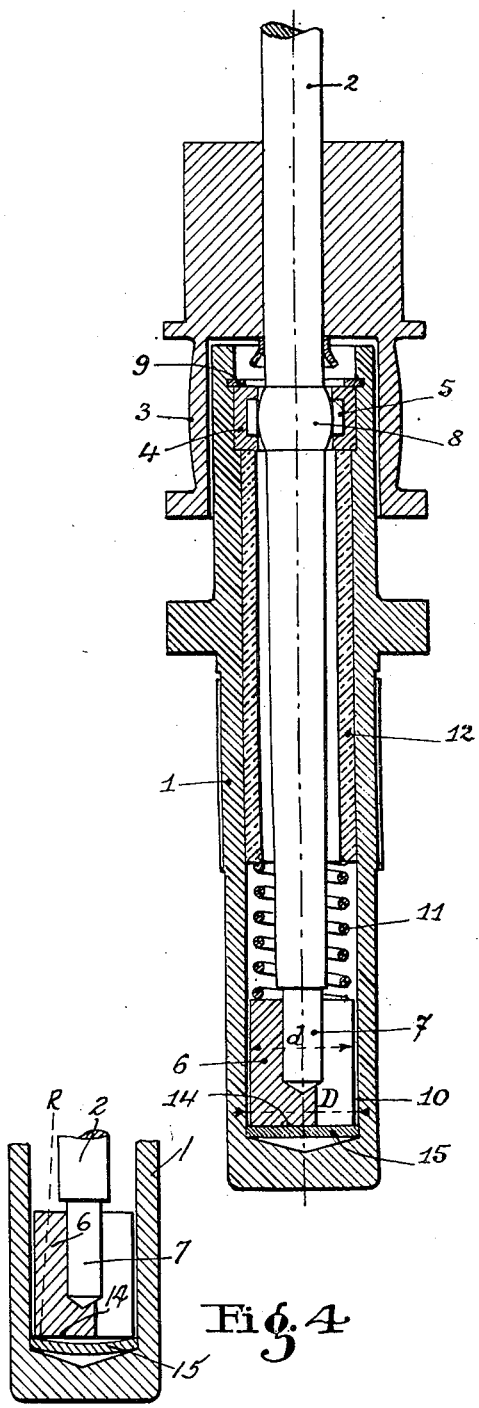
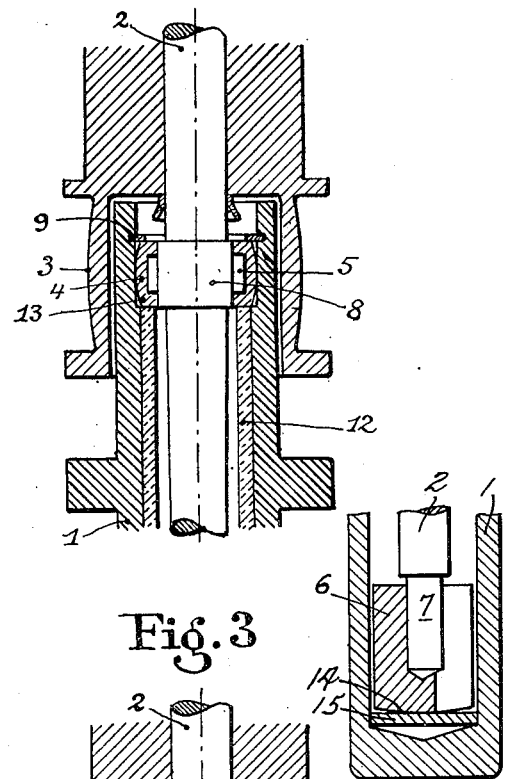
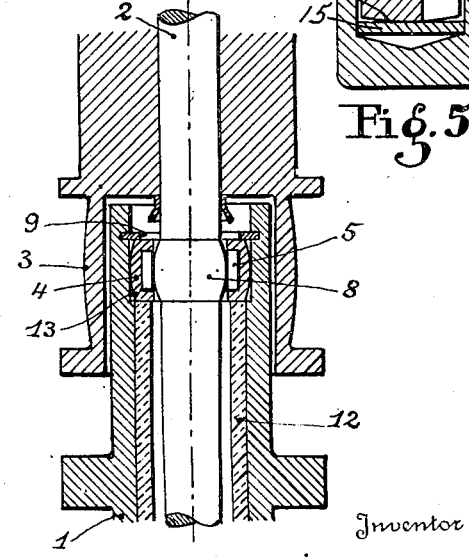
Inventor
Alfred Pitner.
By William C. Linton
Attorney Patented Mar. 10, 1953

2,631,070

UNITED STATES PATENT OFFICE 2,631,070

SPINDLE BEARING

Alfred Pitner, Paris, France, assignor to Societe dite: Societe Anonyme des Roulements A Aiguilles, Levallois-Perret, France, a French company Application July 12, 1946, Serial No. 683,039
In France July 20, 1945

9 Claims. (Cl. 308—154)

The present invention relates to spindles for spinning.

It is well known in the art to construct spindles for spinning provided with roller bearings, and arranged so as to rotate at high speed with a minimum of vibration and wear, in spite of a lack of balance which is sometimes important as this lack of balance creates appreciable strains on the restraining bearings.

Spindles for spinning of this type have heretofore been constructed with roller bearings, or with bearings mounted in an internal cover situated in the foot of the spindle or exterior casing of the spindle. The use of an internal cover seriously limits the diameter of the shaft of the spindle and, at the same time, on account of vibrations, which occur at high speeds, limits the speed of rotation of the spindle. The object of the present invention is to provide a spindle for spinning having a bearing of simpler construction than those already known, constructed so that a given diameter of driving pulley, it is possible to give to the shaft of the spindle a diameter greater than those of spindles already known and to provide also a spindle which is more rigid than known spindles, and, therefore, vibrating less than the latter at high speeds and being able as a result to receive a speed of rotation in excess of that permissible with these known spindles.

The present invention consists of a spindle for spinning having a roller bearing mounted directly on the external casing of the spindle and a footstep bearing fitted freely in this casing.

Also, according to the present invention, in spindles of this type, the assembly formed by the bearing roller and the shaft of the spindle is preferably constructed so as to allow a slight angular displacement of the spindle shaft relative to its casing, and, to this end, the footstep bearing is mounted in this same casing with a diametrical play with respect to the latter.

This arrangement can be secured in different ways which all come within the scope of the present invention.

The bearing can be mounted rigidly in the casing, so that it can undergo no angular diplacement with regard to the latter, while that part of the shaft of the spindle in contact with the rollers of the bearing is made with a curved projection allowing it to oscillate in the casing.

The external ring of the bearing itself can be mounted oscillatably in the casing so as to be able to oscillate in the latter, to allow an oscillatory movement of the shaft of the spindle relative to the casing, the ring of the bearing being then constructed with a curved external surface.

In the same spindle, the two preceding arrangements can be used in combination.

The lower part of the shaft of the spindle is, as has been said, centred in a footstep bearing mounted freely in the spindle casing so as to be able to follow the axial movements of the shaft of the latter. Preferably, also, the footstep bearing is provided with braking means for its movements relative to the external casing to damp the vibrations of the shaft.

According to the present invention, also, these braking means can consist of a helicoidal spring interposed between this footstep bearing and the bearing ring having the rollers.

This spring can be interposed either directly or indirectly between this footstep bearing and this ring. To reduce the length of this spring and allow an easy regulation of the tension thereof, a sleeve can be arranged below the ring of the bearing between the ring and the spring. By variation of the length of this sleeve, the tension of the spring and the effectiveness of the braking can be modified.

To maintain the resultant of the reaction between the footstep bearing and the bottom of the casing as near as possible to the centre of the footstep bearing in the course of angular displacements of the shaft, in the casing:

(a) The footstep bearing can rest on a concave washer or else (b) The footstep bearing can be constructed with a convex bottom and rest upon a plane washer.

The invention is further described with particular reference to the accompanying drawings which show:

Figure 1 is an axial longitudinal section of a spinning spindle of one of the type defined above in which the shaft of the spindle is constructed with a curved projection in contact with the rollers of the bearing.

Figure 2, in longitudinal axial section, shows the roller bearing of a spinning spindle similar to the preceding Figure 1 with the external ring of this bearing being mounted oscillatably in the casing.

Figure 3, in partial section similar to Figure 2, shows a spinning spindle comprising a combination of the arrangements provided in Figures 1 and 2.

Figure 4 is an axial longitudinal section of the lower portion of the spindle, and discloses the lower part of a spinning spindle according to the invention in which the foot bearing rests on a concave base.

Figure 5 is a further modification of the spindle showing the lower portion thereof in cross section with the convex foot bearing resting on a flat base.

In these different figures, the same reference numerals designate the same elements.

1 is the casing of the spindle,
2 its shaft,
3 the driving pulley mounted on the latter,
4 is the bearing ring of which the rollers are represented by 5,
6 is the foot bearing to receive the lower part of the shaft 2 of the spindle.

In Figure 1, the shaft 2 of the spindle comprises a curved projection 8 in its part in proximity to the rollers 5, the exterior ring 4 of the bearing being mounted rigidly in the casing 1 and kept in the latter by a stop washer 9.

The footstep bearing 6 has a diameter $d$ slightly less than that D of the housing 10 of the casing 1 so as to allow an oscillatory movement of the shaft 2 of the spindle. A hellicoidal spring 11 interposed between this foot bearing 6 and a sleeve 12 mounted between this spring and the external bearing ring 4, damps the oscillatory movements of the spindle. As has been said, by variation of the length of this sleeve, the tension of the spring and efficiency of the braking can be adjusted.

In Figure 2, the external ring 4 of the bearing is constructed with a curvilinear surface 13 so as to be able to oscillate, carrying with it the shaft 2 of the spindle.

In Figure 3, the shaft of the spindle is constructed with a projection 8 allowing it to oscillate and, at the same time, the external ring 4 of the bearing is constructed with an external surface 13 allowing oscillation of the shaft 2.

In Figure 1, the foot bearing 6 has a lower plane face 14 resting on a base 15 constituted by a flat washer.

In Figure 4, the flat base 14 of the foot bearing rests on a washer 15 concave on its face in contact with this base.

In Figure 5, the washer 15 is flat while the base 14 of the foot bearing is convex.

I declare that what I claim is:

1. A spinning spindle support comprising in combination, a fixed casing, a roller bearing directly arranged within said casing, a foot step bearing freely mounted with diametral lateral play within said casing, said foot bearing being spaced from said roller bearing, a spindle having a portion thereof extending within said casing and journalled within each of said bearings, means arranged within said casing for permitting slight oscillatory movements with respect to said casing of the entire portion of that of said spindle extending within said casing and journalled within both of said bearings, means for dampering the oscillatory movements of said spindle, and said dampering means being arranged between said roller bearing and the foot step bearing.

2. A spinning spindle support comprising in combination, a fixed casing, a roller bearing directly arranged within said casing, a foot step bearing freely mounted with diametral lateral play within said casing, said foot bearing being spaced from said roller bearing, a spindle having a portion thereof extending within said casing and journalled within each of said bearings, a ball shaped projection formed with said spindle and engageable with rollers of said roller bearing whereby said spindle may have slight oscillatory movements with respect to said casing of the entire portion of that of said spindle extending within said casing and journalled within both of said bearings, means for dampering the oscillatory movements of said spindle, said roller bearing and the foot step bearing.

3. A spinning spindle support comprising in combination, a fixed casing, a roller bearing directly arranged within said casing, a foot step bearing freely mounted with a diametral lateral play within said casing, said foot bearing being spaced from said roller bearing, a spindle having a portion thereof extending within said casing and journalled within each of said bearings, said roller bearing having the outer face of the outer ring thereof formed with a curvilinear configuration contacting with said casing whereby said roller bearing and said spindle journalled therein may slightly oscillate with respect to said casing, means for dampering the oscillatory movements of said spindle, and said dampering means being arranged between said roller bearing and said foot step bearing.

4. A spinning spindle support comprising in combination, a fixed casing, a roller bearing directly arranged within said casing, a foot step bearing freely mounted with a diametral lateral play within said casing, said foot bearing being spaced from said roller bearing, a spindle having a portion thereof extending within said casing and journalled within each of said bearings, a ball shaped projection formed with said spindle and engageable with rollers of said roller bearing, said roller bearing having the outer face of the outer ring thereof formed with a curvilinear configuration contacting with said casing whereby said roller bearing and said spindle journalled therein may slightly oscillate with respect to said casing, means for dampering the oscillatory movements of said spindle, said dampering means being arranged between said roller bearing and said foot step bearing.

5. A spinning spindle support comprising in combination, a fixed casing, a roller bearing directly arranged within said casing, a foot step bearing freely mounted with a diametral lateral play within said casing, said foot bearing being spaced from said roller bearing, a spindle having a portion thereof extending within said casing and journalled within each of said bearings, means arranged within said casing for permitting slight oscillatory movements with respect to said casing of the entire portion of that of said spindle extending within said casing and journalled within both of said bearings, a coil spring arranged coaxially to said spindle between said roller bearing and said foot step bearing for dampering the oscillatory movements of said spindle.

6. A spinning spindle support comprising in combination, a fixed casing, a roller bearing directly arranged within said casing, a foot step bearing freely mounted with a diametral lateral play within said casing, said foot bearing being spaced from said roller bearing, a spindle having a portion thereof extending within said casing and journalled within each of the said bearings, means arranged within said casing for permitting slight oscillatory movements with respect to said casing of the entire portion of that of said spindle extending within said casing and journalled within both of said bearings, a sleeve and a coil spring arranged butt and butt and coaxially to said spindle between said roller bearing and said foot step bearing with said coil spring damping the oscillatory movements of said spindle.

7. A spinning spindle support comprising in combination, a fixed casing, a roller bearing directly arranged within said casing, a foot step bearing freely mounted with a diametral lateral play within said casing, said foot bearing being spaced from said roller bearing, a spindle having a portion thereof extending within said casing and journalled within said casing for permitting slight oscillatory movements with respect to said casing of the entire portion of that of said spindle exending within said casing and journalled within both of said bearings, means for dampering the oscillatory movements of said spindle, said dampering means being arranged between said roller bearing and said foot step bearing, a disc washer seated within the lower end of the inner space of the casing, said foot step bearing having the lower end thereof in sliding contact with said disc washer to permit a slight diametrical lateral movement of said foot bearing with respect to said casing.

8. A spinning spindle support comprising in combination, a fixed casing, a roller bearing directly arranged within said casing, a foot step bearing freely mounted with a diametral lateral play within said casing, said foot bearing being spaced from said roller bearing, a spindle having a portion thereof extending within said casing and journalled within each of said bearings, means arranged within said casing for permitting slight oscillatory movements with respect to said casing of the entire portion of that of said spindle extending within said casing and journalled within both of said bearings, means for dampering the oscillatory movements of said spindle, said dampering means being arranged between said roller bearing and said foot step bearing, a concave disc washer seated within the lower end of the inner space of said casing, said foot step bearing having the lower end thereof in sliding contact with said disc washer to permit slight diametrical lateral movements of said foot bearing with respect to said casing.

9. A spinning spindle support comprising in combination, a fixed casing, a roller bearing directly arranged within said casing, a foot step bearing freely mounted with a diametral lateral play within said casing, said foot bearing being spaced from said roller bearing, a spindle having a portion thereof extending within said casing and journalled within each of said bearings, means arranged within said casing for permitting slight oscillatory movements with respect to said casing of the entire portion of that of said spindle extending within said casing and journalled within both of said bearings, means for dampering the oscillatory movements of said spindle, said dampering means being arranged between said roller bearing and said foot step bearing, a plane disc washer seated within the lower end of the inner space of the casing, said foot step bearing having the lower end thereof formed and seated upon said plane disc washer to permit slight diametrical movements of said foot bearing with respect to said casing.

ALFRED PITNER.

REFERENCES CITED

The following references are of record in the file of this patent:

UNITED STATES PATENTS

| Number | Name | Date |
|---|---|---|
| 215,142 | Mayor | May 6, 1879 |
| 392,912 | Draper | Nov. 13, 1888 |
| 1,124,476 | Lerch | Jan. 12, 1915 |
| 1,814,743 | Eisenlohr et al. | July 14, 1931 |
| 1,867,081 | Krider | July 12, 1932 |
| 2,097,797 | Magrath | Nov. 2, 1937 |
| 2,207,896 | Rothschild | July 16, 1940 |
| 2,243,146 | Beede | May 27, 1941 |
| 2,283,963 | Winslow | May 26, 1942 |
| 2,351,951 | Gleitz | June 20, 1944 |

FOREIGN PATENTS

| Number | Country | Date |
|---|---|---|
| 725,540 | France | 1932 |